United States Patent
Boufounos et al.

(10) Patent No.: US 9,501,717 B1
(45) Date of Patent: Nov. 22, 2016

(54) METHOD AND SYSTEM FOR CODING SIGNALS USING DISTRIBUTED CODING AND NON-MONOTONIC QUANTIZATION

(71) Applicant: Mitsubishi Electric Research Laboratories, Inc., Cambridge, MA (US)

(72) Inventors: Petros T Boufounos, Arlington, MA (US); Diego Valsesia, Borgomanero (IT)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/822,212

(22) Filed: Aug. 10, 2015

(51) Int. Cl.
| | |
|---|---|
| *G06K 9/00* | (2006.01) |
| *G06K 9/48* | (2006.01) |
| *G06K 9/36* | (2006.01) |
| *H04N 19/103* | (2014.01) |
| *H04N 19/154* | (2014.01) |
| *H04N 19/172* | (2014.01) |
| *H04N 19/136* | (2014.01) |
| *H04N 19/61* | (2014.01) |
| *G06T 1/00* | (2006.01) |

(52) U.S. Cl.
CPC ............ *G06K 9/481* (2013.01); *G06K 9/36* (2013.01); *G06T 1/0007* (2013.01); *H04N 19/103* (2014.11); *H04N 19/136* (2014.11); *H04N 19/154* (2014.11); *H04N 19/172* (2014.11); *H04N 19/61* (2014.11); *G06T 2207/10036* (2013.01); *G06T 2207/10044* (2013.01)

(58) Field of Classification Search
CPC ...... G06K 9/36; G06K 9/4652; G06K 9/481; G06K 9/6202; G06K 9/6215; G06K 9/6218; H04N 19/0009; H04N 19/10; H04N 19/103; H04N 19/124; H04N 19/132; H04N 19/136; H04N 19/146; H04N 19/154; H04N 19/172; H04N 19/184; H04N 19/186; H04N 19/61; H04N 19/63; G06T 1/0007; G06T 5/001; G06T 5/007; G06T 5/10; G06T 9/00; G06T 9/0008; G06T 2207/20016; G06T 2207/20148; H03M 7/24; H03M 7/3046; H03M 7/3059; G06F 17/30247; G06F 17/30256

See application file for complete search history.

(56) References Cited

U.S. PATENT DOCUMENTS

| | | | |
|---|---|---|---|
| 6,784,812 B2 * | 8/2004 | Craven | H03M 7/3046 341/50 |
| 7,275,036 B2 * | 9/2007 | Geiger | G10L 19/022 704/200.1 |

(Continued)

OTHER PUBLICATIONS

Liangjun Wang; Xiaolin Wu; Guangming Shi, "Binned Progressive Quantization for Compressive Sensing," Image Processing, IEEE Transactions on , vol. 21, No. 6, pp. 2980,2990, Jun. 2012, doi: 10.1109/TIP.2012.2188810.

*Primary Examiner* — Jose Couso
(74) *Attorney, Agent, or Firm* — Gene Vinokur; James McAleenan; Hironori Tsukamoto

(57) ABSTRACT

A method reconstructs and an uncompressed signal by first obtaining an encoded signal corresponding to the uncompressed signal, wherein the encoded signal includes universally quantized dithered linear measurements of the signal, and wherein each universally quantized dithered linear measurement is a quantized dithered linear measurement of the signal missing one or more significant bits. Side information about the signal is obtained, and the side information is used to obtain a prediction of the signal. The missing one or more significant bits are determined from the encoded signal using the prediction of the signal and the missing one or more significant bits are combined with the encoded signal to produce quantized dithered linear measurements of the signal. Then, the signal can be reconstructed as a reconstructed signal using the quantized dithered linear measurements.

27 Claims, 9 Drawing Sheets

(56) References Cited

U.S. PATENT DOCUMENTS

| | | |
|---|---|---|
| 7,392,424 B2 | 6/2008 | Ho et al. |
| 8,768,075 B2 | 7/2014 | Boufounos et al. |
| 8,837,727 B2 | 9/2014 | Boufounos et al. |
| 8,947,274 B2 * | 2/2015 | Shibata ............... H03M 7/3059 341/107 |
| 2007/0223823 A1 * | 9/2007 | Islam ................... H04N 19/132 382/232 |

* cited by examiner

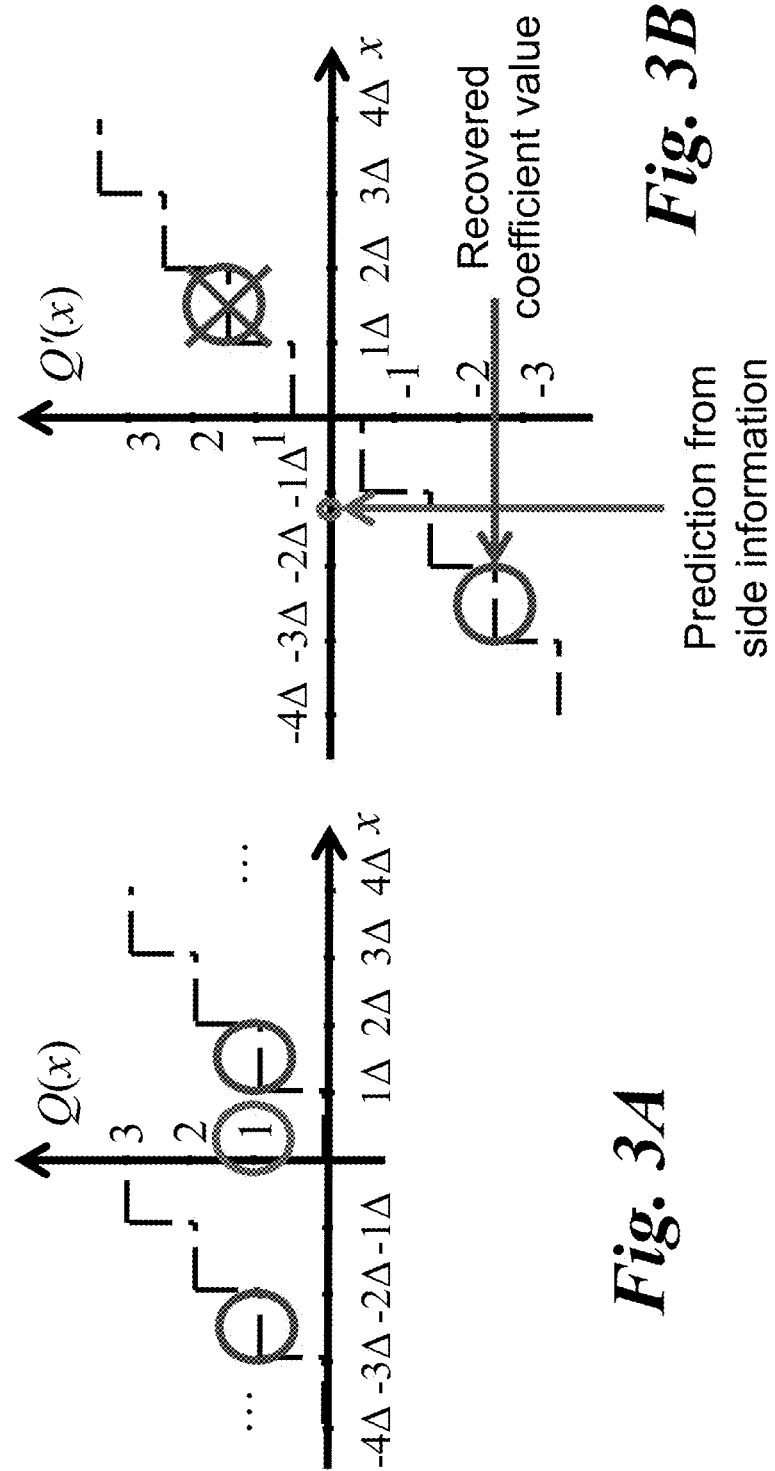

METHOD AND SYSTEM FOR CODING SIGNALS USING DISTRIBUTED CODING AND NON-MONOTONIC QUANTIZATION

FIELD OF THE INVENTION

This invention relates generally to signal processing, and more particularly to coding uncompressed signals, wherein the coding includes encoding and decoding.

BACKGROUND OF THE INVENTION

Lossy compression is widely used in signal processing and signal transmission. There are several applications of lossy signal compression, such as the compression of camera images, multispectral images, hyperspectral images, and synthetic aperture radar (SAR) data, to name a few. In such applications, the goal is to encode the signal with an encoder and use a small number of bits to represent the signal, such that the signal can be transmitted at a lower bit rate, at the expense of some distortion in the signal, i.e., there is some loss of information duting the compression, hence the compressions is lossy.

FIG. 1A is a block diagram of a conventional coding method and system. The system includes an encoder 110 and a decoder 120. The encoder takes as input an uncompressed sugnal 101 and produces a compressed signal 111. Lossless transmission 115 is used to transmit the compressed signal to the decoder, which produces a decompressed signal 121, which is an estimate of the uncompressed signal.

The goal of the encoder, i.e., the system or method performing the compression, is to produce a bitstream, i.e., a sequence of bits that represent the signal with as little distortion as possible for a given bit-rate. Alternatively the encoder might produce a bitstream with as few bits as possible given the distortion that can be tolerated by the application.

The decoder, i.e., the system or method decompressing the signal, uses the sequence of bits produced by the decoder to recover the original signal with as little distortion as possible for the given bit rate.

Most commonly used encoding methods use two techniques: prediction followed by transformation. The prediction tries to predict parts of the signal being encoded, e.g., blocks of an image, using information from other parts of a signal or other signals. Therefore, the encoder includes prediction parameters in the bitstream, i.e., how the prediction was performed, e.g., which part of the signal was used and which prediction method was used, so that the decoder can also perform the same prediction step.

Because the prediction is typically imperfect, there is a prediction residual that is also encoded. The hope is that the residual is easy to encode, so that when the rate used to transmit the prediction parameters and the rate used to code the residual is lower than simply encoding the signal without prediction.

To encode the residual, the encoder first uses a transformation, which maps the signal to a different domain that is simpler to encode. The goal of the transformation is to expose the structure of the signal such that the encoding requires a small number of bits. For example, image and video compression might transform the residual using a discrete cosine transform (DCT) because it is easier to encode the DCT coefficients of the residual than the residual itself, even though they both represent the same information. The reason is that the DCT concentrates the information to a few significant coefficients that are encoded.

Those two techniques are typically combined with other techniques that refine the performance of the encoder, e.g., by selecting how many bits of the bitstream to use for each part of the signal so that the trade off between rate and distortion is optimally traded throughout the signal.

Unfortunately, those encoding techniques produce very complex encoders, and, typically require very simple decoders. This is acceptable in many applications, such as image encoding, such as movies and videos. There, the encoder has essentially unlimited resources, and the decoer at the playback device has limited resources. However, in applications in which the encoder has to be limited computationally, this becomes problematic.

For example, the computational resources available for satellite image or radar signal compression is very limited due to restrictions on the processors and power that can withstand space travel conditions. Similarly, in applications, such as hyperspectral or multispectral image compression, the amount of data that need to be used for prediction and transformation require memory storage prohibitive for the state of the art portable devices. Even modern video compression in mobile devices, e.g., mobile telephones and other handheld devices, uses a separate processor to minimize the load on the main processor, and to reduce power consumption. For many of such applications, the computational resources and power available to the decoder are assentially unlimited. Hence, it makes sense to decrease the complexity of the encoder at the expensense of more complex decoders.

An alternative approach is distributed compression, also known in the art as compression with side information. This class of methods does not perform the prediction step at the encoder. Instead of the encoder predicting the signal and encoding the residual, the encoder assumes that the decoder is capable of preforming some prediction about the signal from side information available at the decoder. Because the prediction is based on the side information, it can be imperfect, and, therefore, the decoding can incur significant distortion. Thus, the role of the encoder is to transmit a bitstream that can be used with the prediction at the decoder to reduce the distortion of the decoded signal.

In practice, all practical coding with side information methods attempt to correct a bitstream. Specifically, the prediction method at the decoder attempts to predict a predicted bitstream that, when subsequently decoded further, can produce the decompressed signal. The encoder attempts to generate a transmitted bitstream that can correct the errors in the predicted bitstream to produce an error-free bitstream. The error-free bitstream is subsequently used for the reconstruction.

To encode the transmitted bitstream, the encoder still performs the transformation step but then uses error correcting codes (ECC) to encode information. Because the bitstream is available at the decoder through the prediction, it is only necessary to transmit a small amount of error-correcting information generated by the ECC, known as syndromes. Because the prediction step is performed at the decoder, the encoder complexity is significantly reduced. On the other hand, the decoder complexity increases significantly, making compression with side information applicable when the decoder can be a more powerful system than the encoder.

FIG. 1B shows a method and system for coding using syndromes and side information. The system includes an encoder 210 that takes input an uncompressed signal 201 to produce a compressed signal 211 or syndrome, which is transmitted losslessly 115 to a decoder 220, which produces a decompressed signal 221.

Although compression with side information reduces the load at the encoder, it still requires the transformation step in addition to the encoding step, which, in some cases, can be computationally complex.

Furthermore, because all practical compression methods use error correction and decode the bitstream separately, those methods ensure that the bitstream can be accurately corrected. If the methods fail to transmit sufficient error correcting information, then the decoding can fail and recover a signal that is unrelated to the original signal. In many cases, failure in the error correction might result to a bitstream that cannot be decoded.

For this reason, most practical methods transmit a larger number of syndrome bits than necessary, to guarantee the correction works, thus wasting bandwidth. In addition, the extra bits do not improve the distortion performance of the compression method. Alternatively, a feedback-based rate control system can be implemented on top of the compression system, which attempts decoding and, when unsuccessful, require more syndrome bits. This requires two-way communication between the encoder and the decoder, which is not possible in many applications.

SUMMARY OF THE INVENTION

The embodiments of the invention provide a method and system for decoding a signal that was compressed using non-monotonic quantization. This enables a graceful degradation of decoding the compressed signal. In the embodiments of the invention, if sufficient bits are not transmitted for a given distortion, then the decoder reconstructs a signal with a higher distortion, i.e., worse quality. If, instead, more bits than necessary are transmitted given the desired distortion, these bits are not wasted. The decoded signal distortion is lower than the desired distortion, i.e., the quality is higher. This graceful degradation during the decoding properties is one of the key attributes of this invention.

Another key property of this invention is that it does not require separate transformation and error-correcting-coding steps, making embodiments of the invention simpler compared to state of the art decoding with side information.

Furthermore, the decoder predicts the uncompressed signal itself and not the bitstream, which enables the use of available state of the art signal prediction methods. Due to the separation of bitstream correction and bitstream decoding in conventional compression with side information, using such state of the art signal prediction approaches is not straightforward and, often, not possible.

Universality

Another advantage of embodiments of this invention is that they are universal. This means that the same encoder can be used to encode a large number of different signals, and the design of the encoder is independent of the signal properties or structure.

The encoder can have a very small number of parameters that need to be adjusted so that the encoder works with different kinds of signals, and hence is universal. This is in contrast to the state of the art wherein the encoder and decoder have to be carefully designed for a specific application, for example, by picking a transform that better compresses the signal. In some embodiments of the invention, the design is only required at the decoder.

Specifically, some embodiments of the invention add dither to linear measurements of an uncompressed signal. The measurements are quantized using a non-monotonic quantizer. These quantized measurements comprise the encoding of the signal. The non-monotonic quantizer removes superfluous information, such as one or more most significant bits (MSB), from the measurements that are redundant given the side information, i.e., information that can be recovered when side information is available. The encoded signal can be transmitted to a decoder, which uses the side information to produce and estimate of the uncompressed signal.

BRIEF DESCRIPTION OF THE DRAWINGS

FIGS. 3A-3B are schematics of recovering missing information from a prediction in a decoder according to embodiments of the invention;

DETAILED DESCRIPTION OF THE PREFERRED EMBODIMENTS

Non-Monotonic Quantization for Compression with Side Information

Compression Method and System

Figure 1A:
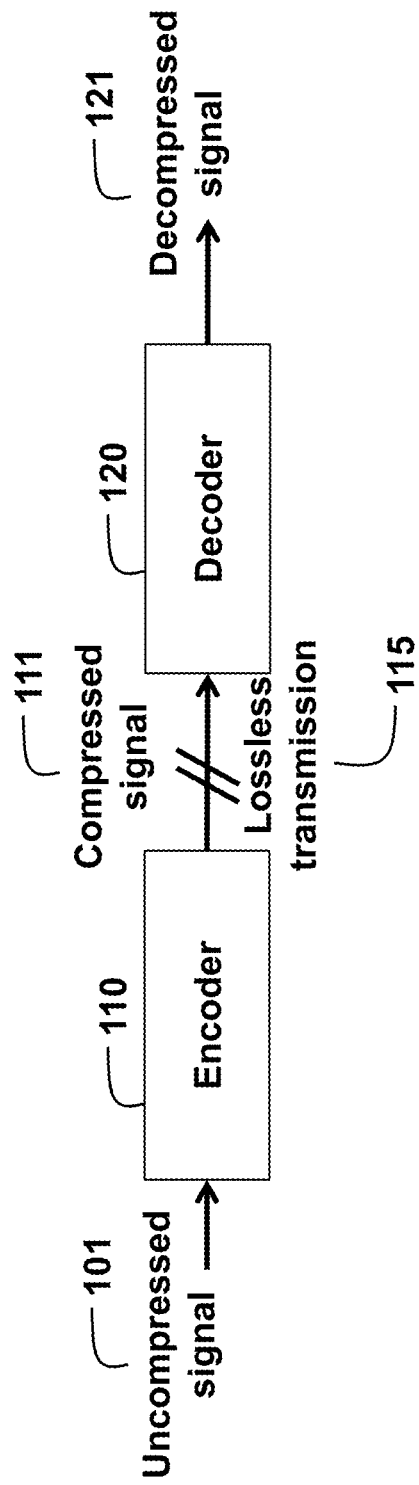
FIG. 1A is a high level block diagram of a conventional compression method and system.
Figure 1B:
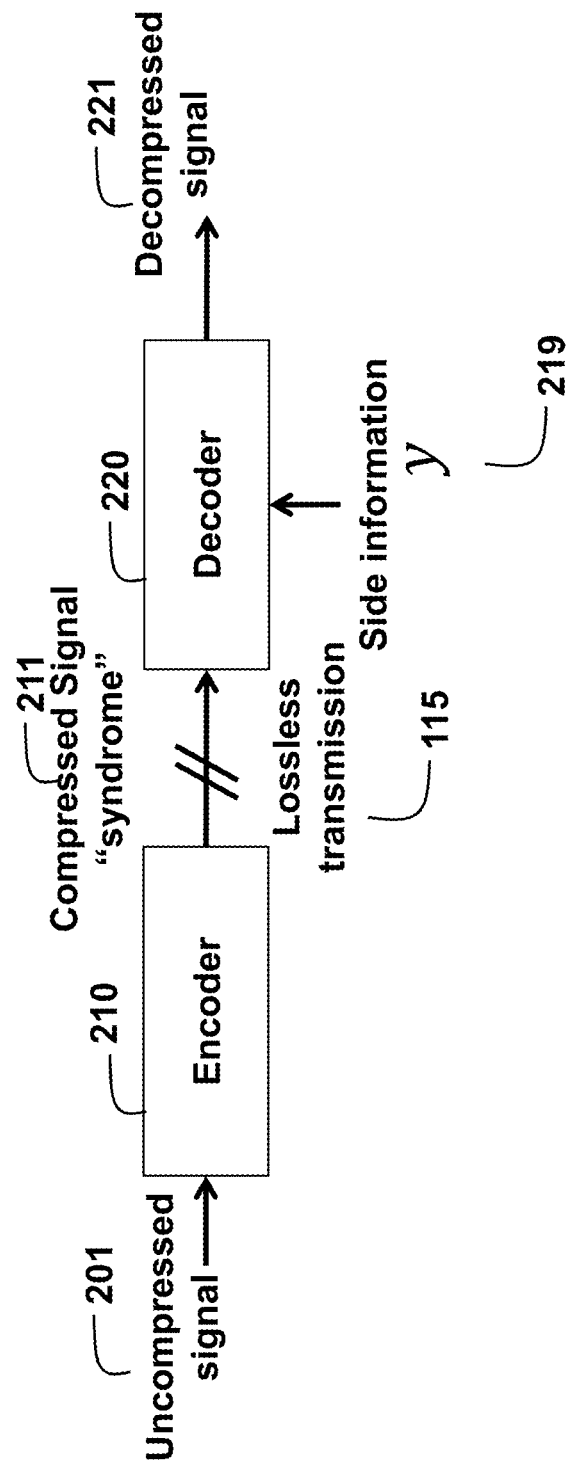
FIG. 1B is a high level block diagram of a conventional compression method and system using side information.
Figure 1C:
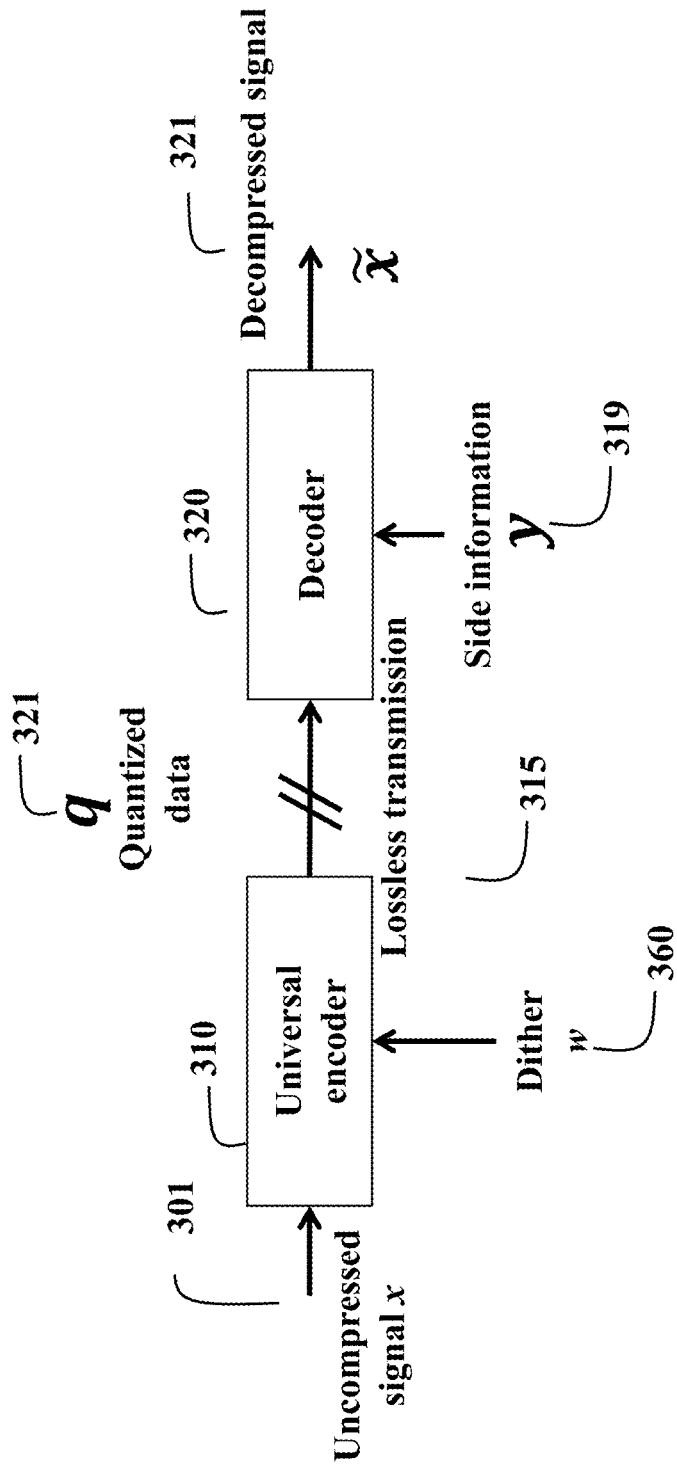
FIG. 1C is a high level block diagram of a compression method and system according to embodiments of the invention.

FIG. 1C shows a method and system for compressing according to some embodiments of the invention. The system includes an encoder 310 that takes an uncompressed signal 301 as input to produce quantized measurements 321, which can be transmitted losslessly 315 to a decoder 320. The decoder decodes the quantized measurements using side information y 319 to produce a decompressed signal 321.

Overview

Encoder

The role of the universal encoder is to encode the signal x 301 to a bitstream that is the compressed signal 321. The encoder assumes that the decoder is able to use the side information y 319 form a prediction of x, denoted $\hat{x}$, which can include some distortion.

To encode the uncompressed x, the encoder 310 obtains linear measurements of x, to which dither w 360 is added, and then quantized using non-monotonic quantization to produce quantized data q 321, i.e., the compressed signal. As described below, non-monotonic quantization can be though of as removing superfluous information, e.g., one or more most significant bits, from the quantized measurements that can recovered by the decoder 320.

Decoder

The decoder uses the side information 319 to form $\hat{x}$, which is an estimate of x. Next, the decoder obtains linear measurements of $\hat{x}$ and adds the dither w. The result is quantized with a non-monotonic quantizer, thus producing a prediction of the information missing from q, which is the encoding of x. The missing information is added to q to produce a set of quantized measurements q̃. These measurements are used, together with the prediction x̂ of x, and any other prior knowledge about x, to reconstruct x̃, an estimate of x with significantly less distortion than x̂.

Encoding

Figure 2A:
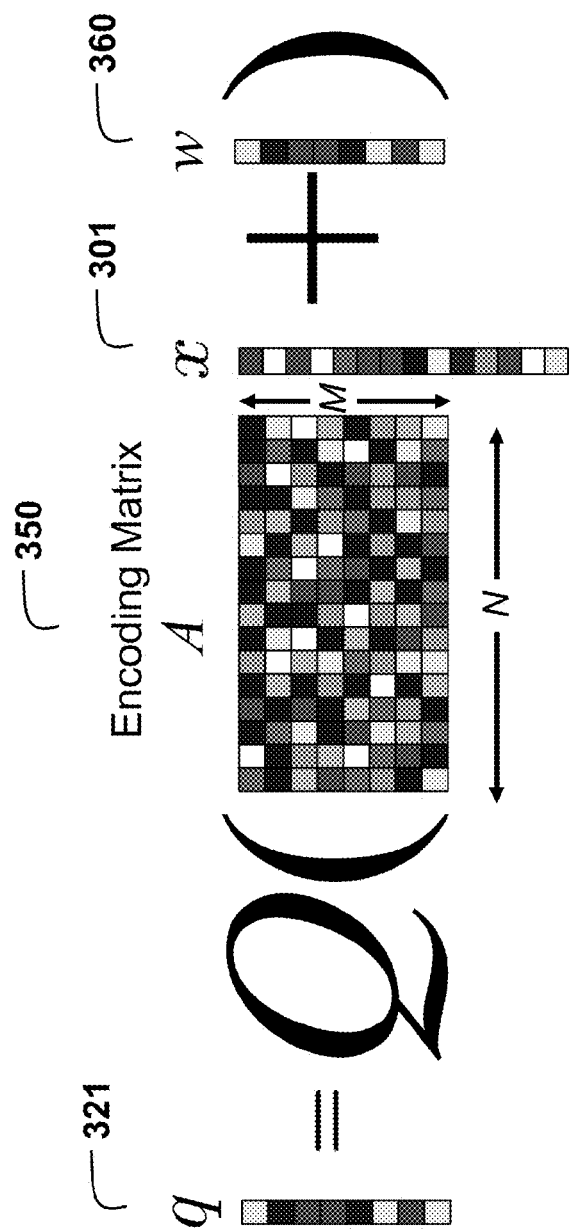
FIG. 2A is a schematic of an operation of a universal encoder using an encoding matrix according to embodiments of the invnetion.

FIG. 2A shows the encoding schematically. The uncompresed signal x 301 has N dimensions, which can be real or complex. The invention uses an encoding matrix A 350 with dimensions M×N to obtain M linear measurements Ax of the signal x. The matrix A may be real or complex. In preferred embodiments, real signals are measured using real matrices, and complex-valued signals are measure using complex-valued matrices. However, in some embodiments the real signal can be measured using a complex-valued matrix, and vice versa.

The matrix can be generated in a number of ways. In the preferred embodiments, the matrix is generated randomly. For example, entries in the matrix A can be a realization of random variables drawn from an i.i.d. uniform, Rademacher, Gaussian, or sub-Gaussian distribution. Alternatively, rows of the matrix A can be uniformly sampled from a unit sphere in N dimensions.

In another embodiment, the matrix A can be a discrete Fourier transform (DFT) matrix, or a Hadamard transform matrix, or a discrete sine or cosine transform (DCT or DST) matrix, or any of the above matrices with columns permuted and some of rows removed. In another embodiment, the matrix can be a low density parity check code (LDPC) matrix, or an expander graph matrix. The advantage of using structured matrices (DFT, DCT, DST, Hadamard) or sparse matrices (LDPC, expander graphs) is that these matrices require less memory and processing, thus reducing the complexity of the encoder.

Subsequently, the dither w 360 is added to the linear measurements as Ax+w and the result is quantized using a non-monotonic B bit scalar quantizer with quantization parameter Δ. In the preferred embodiment the dither is randomly generated from a uniform distribution with support Δ or $2^B$Δ. Note that because this is a scalar quantizer and the input is a vector, the quantizer function is applied element-wise to each of the vector elements.

Figure 2B:
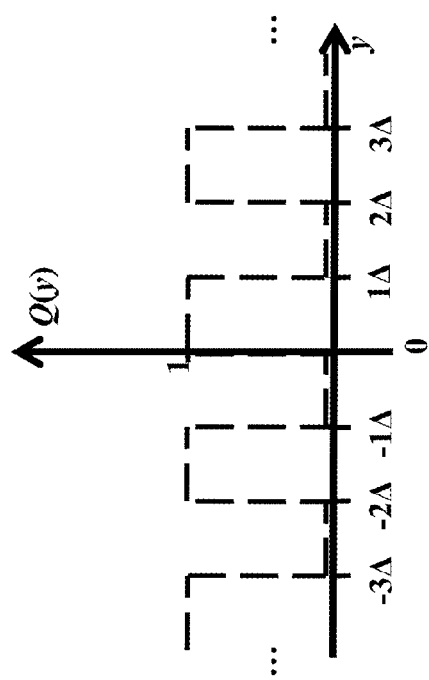
FIGS. 2B-2C are schematics of scalar quantization according to embodiments of the invention.
Figure 2C:
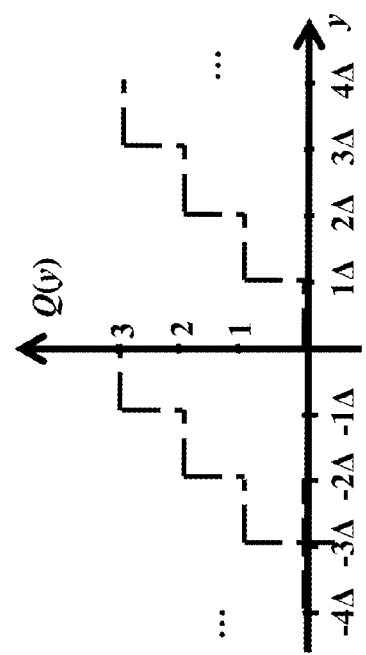

FIGS. 2B and 2C schematically show a B bit scalar quantizer respectivaly for the case of B=1 and B=2. In particular, the scalar quantization function is periodic with period $2^B$ and has $2^B$ distinct output levels, which can be represented using B bits. The input space is partitioned into intervals of length Δ, and each interval maps to one of the $2^B$ output levels. Multiple intervals map to the same level.

Figure 2D:
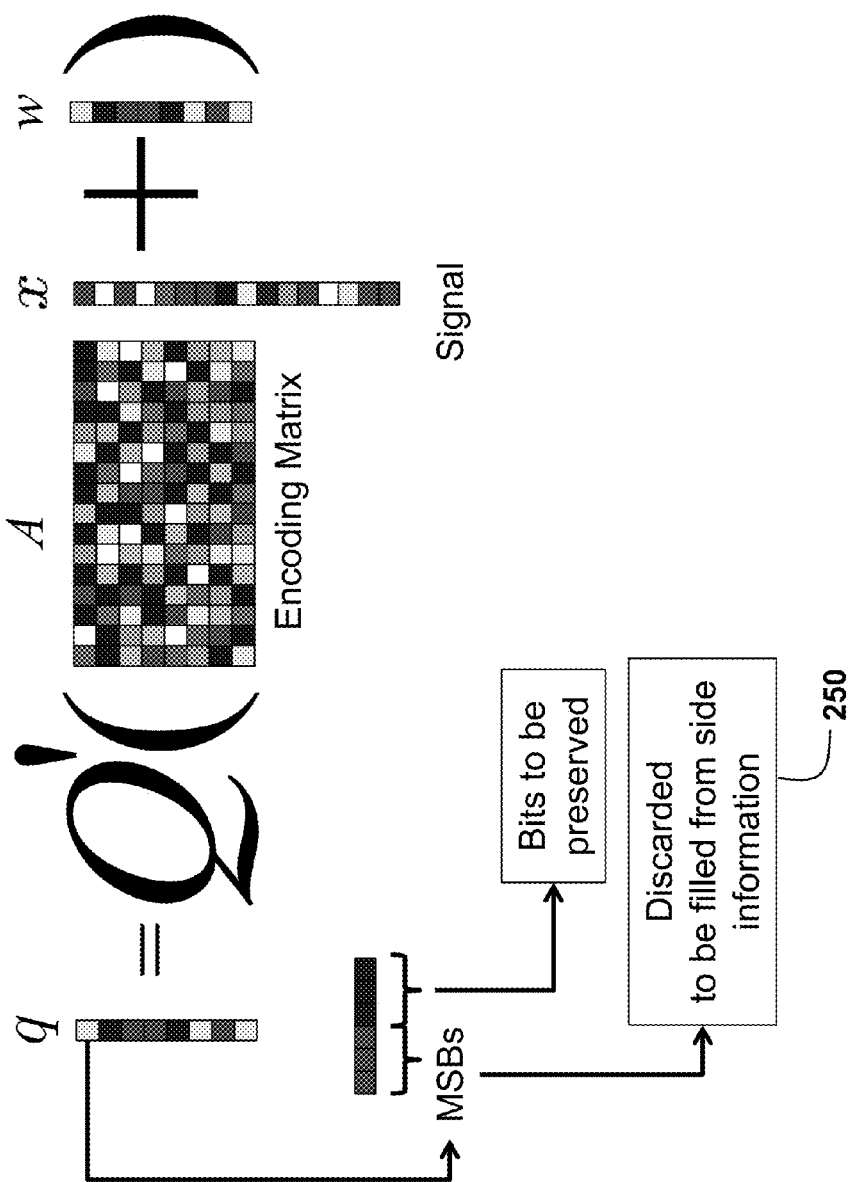
FIG. 2D is a schematic of an alternative interpretation of the operation of the universal encoder according to embodiments of the invention.

As shown in FIG. 2D, the non-monotonic quantizer Q(•) can also be viewed as a uniform scalar quantizer Q'(•) with quantization interval Δ followed by an operation that maps different quantization levels to one. The uniform scalar quantizer Q'(•) produces a multibit representation with one or more of the most significant bits (MSBs) discarded 250. Thus, all quantization levels with the same least significant bits (LSBs) preserved 251 have the same output. The output of the encoder is q 321, used by the decoder 320 to estimate the input signal x 301.

Decoding

The decoder 320 has access to side information y 319 that enable the estimatation x̂, with some distortion of the signal x. The predictor for the estimate of x̂ is a function $f(•)$, and the prediction is determined by applying this function $$\hat{x} = f(y). \quad (1)$$

A number of methods can be employed to predict the signal, and a number of ways can be employed to obtain side information at the decoder, some of which are described below.

The decoder measures the predicted signal and adds dither w, in the same manner as the encoder. The, the decoder quantizes using a uniform scalar quantizer with quantization interval Δ

$$\hat{q} = Q'(A\hat{x}+w), \quad (2)$$

The predicted quantized measurements q̂ contain information that, when combined with the encoding q, can produce decoded quantized measurements q̃, based on which, the signal can be decompressed. To extract this information, the decoder selects a level from the set of possible output levels used by the uniform quantizer Q'(•). Specifically, each coefficient $\tilde{q}_i$ is selected from all the levels that are consistent with the corresponding encoding $q_i$. From all these levels, the closest level to the predicted coefficient q̂ is selected.

This selection is demonstrated by examples shown in FIGS. 3A-3B. Given an encoding level $q_i=1$, there are multiple possible consistent regions, two of which are shown in FIG. 3A. The corresponding uniform quantizer, shown in FIG. 3B, has two different quantization levels consistent with the encoding $q_i=1$, which correspond to $\hat{q}_i=-2.5$ and $\hat{q}_i=1.5$, denoted by a circle in the figure Because the prediction from the side information $\hat{q}_i$ is closest to the level −2.5, this is selected as the decoded quantized measurement $\tilde{q}_i$, while the level 1.5 is discarded, as denoted by the circle with the cross in the figure. Note that the levels of the non-monotonic and the uniform quantizers do not necessarily coincide.

Ideally, the decoded measurements q̃ should be equal with corresponding measurements of the compressed signal using the scalar quantizer, i.e., the measurements should be equal to Q'(Ax+w). However, in practice there can be some decoding errors. In some embodiments, these errors can be ignored because the subsequent reconstruction can compensate for the errors as described in the following.

In some embodiments, the encoder can use other information that enable correction of these errors at the decoder. For example, if the encoder has access or can determine the predicted measurements, then the encoder can determine the coefficients where errors occur. The encoder can then transmit a separate bitstream indicating the location of these errors, so that the decoder can discard those coefficients. Alternatively the encoder can transmit a correction to these errors so that the coefficients are not discarded.

Given the decoded measurements q̃, the decoder reconstructs an estimate of the signal x̃ using the side information, the prediction and any prior information about x, such as a general model.

Reconstruction

The goal of the decoder is to estimate the signal x̃ that is consistent with the decoded measurements and adheres to prior knowledge about models of x. For example, a conventional model has sparsity in some basis, or low total-variation norm.

In the case of the sparsity model, the reconstruction for the estimate takes the form of an optimization, such as $$\tilde{a} = \arg\min_{a} \|a\|_p \text{ s.t. } \tilde{q} = Q'(ABa + w), \text{ and} \qquad (3)$$

$$\tilde{x} = B\tilde{a}, \qquad (4)$$

where $0 \leq p \leq 1$ and $\|\cdot\|_p$ denotes an $l_p$ norm, B denotes a basis or a dictionary in which the signal is assumed to be sparse, and $\tilde{a}$ denotes the sparse coefficients comprising the signal in the basis B.

Similarly, for a low total variation model the reconstruction takes the form $$\tilde{x} = \arg\min_{x} \|x\|_{TV} \text{ s.t. } \tilde{q} = Q'(Ax + w), \qquad (5)$$

where $\|\cdot\|_{TV}$ denotes the appropriate total variation norm for the signal model.

Often, the optimization can use the side information to produce weights for the norms:

$$\tilde{a} = \arg\min_{a} \|a\|_{p,v} \text{ s.t. } \tilde{q} = Q'(ABa + w), . \qquad (6)$$

$$\tilde{x} = B\tilde{a}, \qquad (7)$$

and $$\tilde{x} = \arg\min_{x} \|x\|_{TV,v} \text{ s.t. } \tilde{q} = Q'(Ax + w), \qquad (8)$$

where $\|\cdot\|_{p,v}$ and $\|\cdot\|_{TV,v}$ are the weighted $l_p$ and total variation norms, respectively, as known in the art. The weights v can be derived from the side information or the prediction of x. For example, if the prediction is sparse in the basis B, then the weight can be set such that the sparsity pattern of the reconstructed signal is similar to the sparsity of the basis using methods well known in the art.

If the side information is a similar signal it can also be used as an additional soft or hard constraint in the optimizations above, e.g., by requiring that the recovered signal $\tilde{x}$ is similar to the prediction $\hat{x}$. This can be enforced, for example, using an additional penalty factor such as $\lambda \|\hat{x} - \tilde{x}\|_2^2$ in the cost function of the optimization (soft constraint) or a constraint such as $\|\hat{x} - \tilde{x}\|_2^2 \leq \epsilon$ (hard constraint), using method well known in the art.

In the optimizations above, the constraint $\tilde{q} = Q'(Ax+w)$ can also be imposed as a soft constraint, e.g., by penalizing $\lambda \|\tilde{q} - Q'(Ax+w)\|_\infty$, or $\lambda \|\tilde{q} - Q'(Ax+w)\|_p$ for $p > 1$.

Other optimizations that can be used include a greedy algorithm, or a convex.

In some embodiments, the reconstructed signal $\tilde{x}$ can be considered a new, improved, prediction of x, leading to new, improved, prediction of the measurements, and, therefore, new and improved decoded measurements, e.g., with fewer errors. This, in turn produces a new reconstruction $\tilde{x}$, with lower distortion. The process can be repeated until a termination condition is reached, e.g., there is no improvement or the improvement is less than a predetermined threshold.

Furthermore, after a reconstructed signal $\tilde{x}$ is available, it can be used in conjunction with the side information and the prediction to further improve the prediction. For example, a dictionary can be learned from the reconstructed signal $\tilde{x}$ and the predicted signal $\hat{x}$, and used to generate a new prediction of the signal given the side information using methods well known in the art. This, again, provides an improved prediction which can be used, as above, to improve the reconstruction. This process can also be repeated until there is no improvement or the improvement is less than the predetermined threshold.

Generation of Side Information

The side information used at the decoder can come from a number of sources, even from the encoder itself in a separate bitstream. For example, the side information can be a compressed version of the same signal with a higher distortion and a lower rate, or a different signal, which is very similar to the signal to be compressed. The side information can also include quantities that improve the prediction of the compressed signal from the signal in the side information, such as the average value of both signals, their variance, and their cross-correlation. This information can also be determined at the encoder and stored or transmitted together with the universal encoding of the signal.

Compression Method and System

Figure 4:
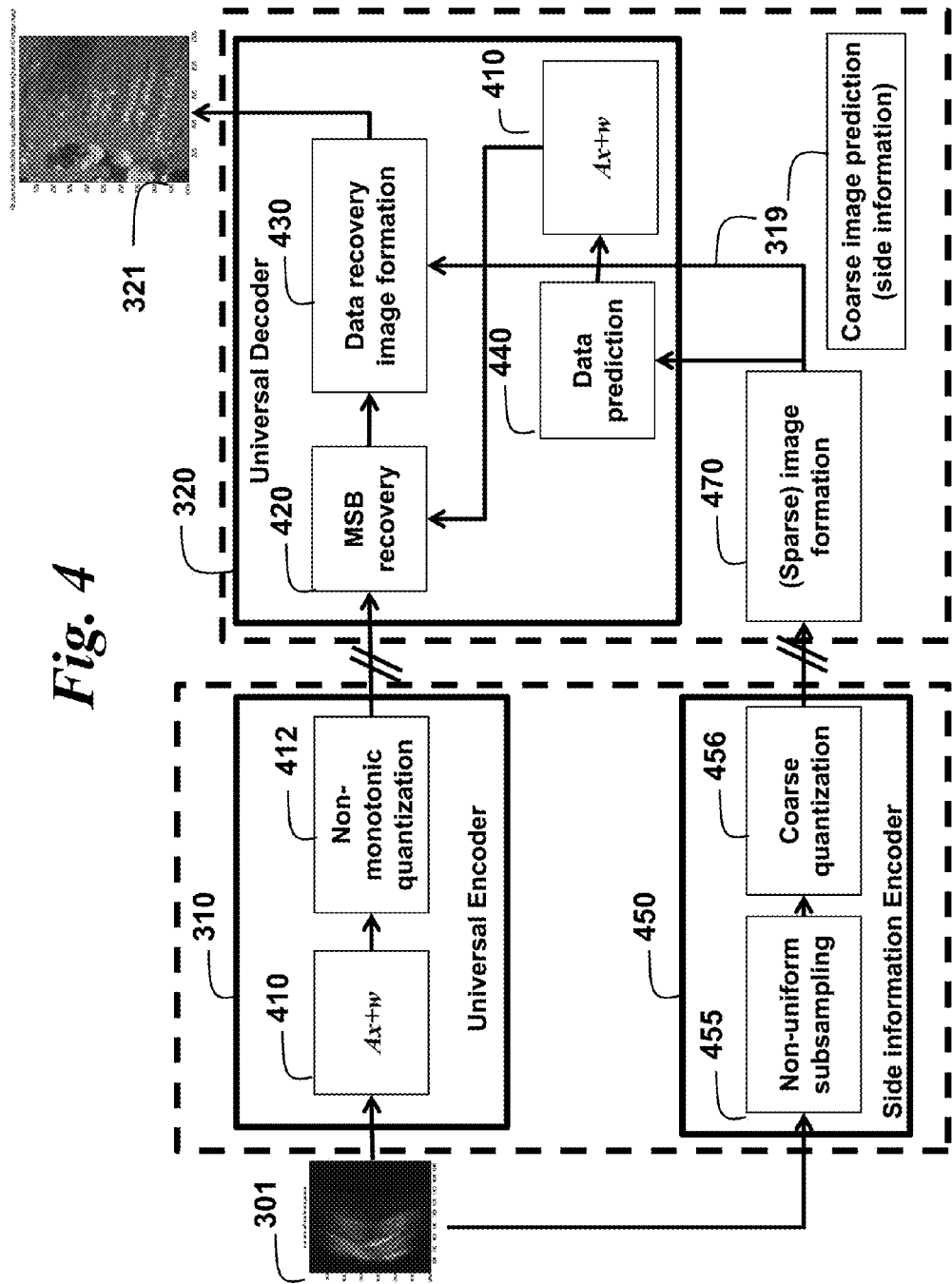
FIG. 4 is a flow diagram of compressing a multispectral or hyperspectral image using embodiments of this invention.

FIG. 4 shows the details of the system according to one embodiment of the invention. The encoder 310 obtains the linear measurements Ax of the input signal 301 and adds dither w as Ax+w 410. Non-monotonic quantization 412 is applied to the universal measurements, which can be transmitted to the decoder 320. This embodiment in FIG. 4 can, for example, be used to compress synthetic aperture radar (SAR) signals, or other radar or light and radr (LIDAR) data. Such data are often used to recover images through a transformation, known as image formation, or image reconstruction.

In this particular embodiment, the encoder can also separately encode information necessary to produce the side information 450. To do so, the encoder can perform non-uniform subsampling 455 and coarse quantization 456. The side information y 319 can also transmitted to the decoder for image formation 470, which produces a coarse image prediction that serves as the side information 319. The decoder can apply data prediction 440 to the side information to predict the measurements Ax+w 410.

From the measurements, the decoder recovers the most significant bits (MSB) of the quantization 420, which recovers the data required to perform image formation 430. Image formation uses can also use the predicted data 440.

Figure 5:
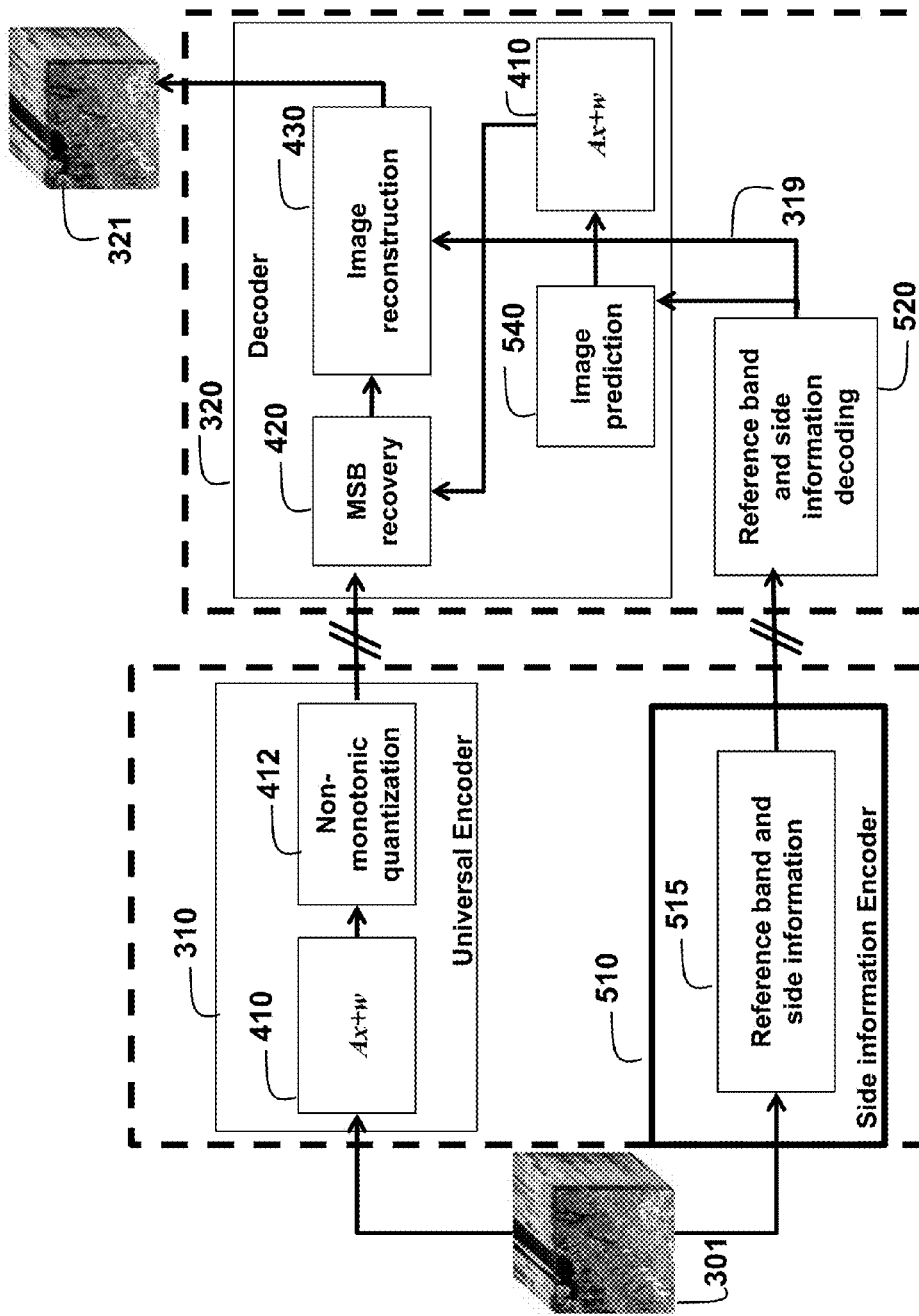
FIG. 5 is a flow diagram of a compressing synthetic aperture radar (SAR) data using embodiments of this invention.

FIG. 5 shows the details of the system according to another embodiment of the invention. This embodiment can be used to compress signals that are similar to a reference singnal, such as multispectal and hyperspectral images. This embodiment is described assuming the signal is a multiband image, such as a multispectal or a hyperspectral image, but other examples could be video sequences or images of the same scene obtained by different cameras, among others.

Here, the encoder produces reference band and side information 520, further described below, which are used by image prediction 540.

Applications and Protocols

Synthetic aperture radar (SAR) are radar systems, often mounted on satellites or airplanes, and typically used to image large areas with very high resolution. SAR systems, operate by emitting pulses and receiving and recording their reflections. These recordings are the raw SAR data that are subsequently processed to produce a SAR image. This processing, known as image formation, is performed at a ground station, typically by a powerful computer, because it requires significant computational power and memory, that is not available at the satellite or the airplane.

SAR raw data are particularly difficult to compress because, at first glance, they seem to lack structure. However, SAR images do have structure (because they are images), which, in principle can be exploited for compression. A conventional compression method or a compression with side information method requires that the image formation is performed at the encoding stage, which can be beyond the computational capabilities of the encoder at the a satellite.

However, an embodiment of the invention can be used to compress the data without performing image formation. This is performed at the decoder, typically a powerful ground station, during the prediction and reconstruction step. Note that the subsequent descriprion uses the word "transmitting" to signify the use of the bitstream after the encoding. This is because, in a typical modern application, such data are immediately transmitted to a server at a ground station for decoding and processing. The data can also be stored in memory or in a permanent storage, e.g., disk or tape, for subsequent retrieval and processing.

The encoder uses the protocol described above to encode and transmit the data. Note that the data received by the SAR system are already measurements of the image, so the encoding matrix implemented on the encoder can be an identity, matrix or a subsampling matrix that selects a subset of the data. The effective encoding matrix A, however, is the composition of the implemented matrix with the matrix describing the linear system from the SAR image to the SAR data.

In many SAR systems, the decoder may not have side information from another source. Thus, the SAR system also generates and transmits the side information. In one embodiment, the SAR data are subsampled or measured with a linear system and then quantized using a conventional uniform quantizer which is coarse, i.e., uses very few bits. These quantized measurements are transmitted as the side information.

The decoder reconstructs a coarse image from the side information, using sparse reconstruction, or reconstruction with low total variation, or reconstruction using a dictionary learned from prior SAR data, and optimization-based reconstruction methods. This coarse image serves as a prediction for the universally encoded signal. Thus, the image is used to generate a prediction of the data and to follow the decoding protocols described above.

SAR data can include data of different polarization or data collected by different satellites. The invention can be similarly used to compress this data. In some embodiments, one polarization or the data from one satellite, or linear measurement of them, can serve as the side information for the decoding of another polarization or the data from another satellite.

Multispectral and Hyperspectral Data

Similar issues appear in multispectral or hyperspectral data. This data includes multiple images obtained from the same target, e.g., a scene, a ground swath, or an object, each image only recording the reflectivity of the target at a specific range of spectral bands—relatively wide range for multispectral, relatively narrow range for hyperspectral. Such systems are often portable and mounted on satellites, airplanes, autonomous aerial vehicles, or ground vehicles, which typically do not have access to significant computational resources.

A key difference of multispectral and hyperspectral data with SAR and other radar data is that multispectral and hyperspectral images are typically aquired directly and an image formation step is not necessary to produce the image. In other words, the data to be compressed is the image itself.

Still, conventional compression methods require a prediction and a transformation step to be perfromed at the encoder. When such systems are used in computation-constrained applications, prediction and transformation of the images can be prohibitively complex. Note that the subsequent discussion uses the word "transmitting" to signify the use of the bitstream after the encoding. This is because, in typical modern application, such data are immediately transmitted to a server for decoding an processing. However the data might be stored in memory or in a permanent storage—hard drive or tape for later retrieval and processing.

Again, embodiments of the invention can be used to efficiently compress such images. The universal encoder protocol operates as described above. For efficiency, the measurement matrix A can operate either on the entire set of images, on small subsets of the images, on each spectral band separately, or on blocks of each image, or combinations thereof.

The side information is also transmitted by the encoder system. In some embodiments, the side information comprises a single reference band, which can be a single image or a panchromatic image comprising the sum of all images on the satellite, or some other combination of the images. This reference band is encoded using embodiments of this invention or a separate encoding system, such as Joint. Photographic Experts Group (JPEG) (ISO/IEC 10918) or JPEG2000. Multispectral and hyperspectral images are very similar between bands, so the reference band can be used as the prediction of the encoded data.

However, often, the prediction can be improved using a linear prediction scheme. If y is a reference, and x is to be predicted, then the linear minimum mean squared error (MMSE) predictor of x is $$\hat{x} = \frac{\sigma_{xy}}{\sigma_y^2}(y - \mu_y) + \mu_x, \qquad (9)$$

where $\mu_x$, and $\mu_y$ are the means of x and y, respectively, $\sigma_x^2$, and $\sigma_y^2$ their variance, and $\sigma_{xy}$ their covariance. It is straightforward and well known in the art how to extend this prediction to the prediction using multiple references.

Because the encoder has access to the reference band, it is straightforward to determine and transmit the relevant means as side information, variances and covariances for all the spectral bands, such that the prediction can be improved at the receiver. If this is transmitted as side information, then the receiver uses the side information to improve the prediction of each spectral band from the reference band. In some embodiments, to further improve the performance, these quantities might be determined, transmitted, and used on parts of the image, e.g., on blocks, such that local statistics of the image are better exploited by the prediction.

Furthermore, as described above, the encoder in this case has the ability to determine a simple prediction of the signal using the side information and, thus, be able to detect when decoding errors will happen. Thus, it can transmit as separate side information the position and can be the magnitude of these errors, so that they can be corrected at the decoder.

Of course, the more side information is determined and transmitted, the higher the rate consumed by the side information. Increasing the rate used for the side information can improve the prediction, thus decreasing the rate required of the universal encoding. However, there are diminishing returns, i.e., the gains decrease. Thus, the amount and the rate required for side information should be balanced with the rate required for the universal encoding.

The decoder uses the side information to predict one or more spectral bands, and then use the encoding to reconstruct the image. If a subset of spectral bands has already been decoded, the subset can be used to improve the prediction of subsequently decoded spectral bands, this improving the decoding performance. As described above, reconstructions can be used as new predictions and to generate new side information so that the process can be repeated, further improving the decoding performance. Dictionary learning techniques can also be used as described above.

We claim:

1. A method for reconstructing a signal, wherein the signal is uncompressed, comprising steps of:
    obtaining an encoded signal corresponding to the signal, wherein the encoded signal includes universally quantized dithered linear measurements of the signal, wherein each universally quantized dithered linear measurement is a quantized dithered linear measurement of the signal missing one or more significant bits;
    obtaining side information about the signal;
    using the side information to obtain a prediction of the signal;
    determining the missing one or more significant bits from the encoded signal using the prediction of the signal;
    combining the missing one or more significant bits with the encoded signal to produce quantized dithered linear measurements of the signal; and
    reconstructing the signal as a reconstructed signal using the quantized dithered linear measurements, wherein the steps are performed in a decoder.

2. The method of claim 1, wherein the side information is encoded as encoded side information, and further comprising:
    decoding the encoded side information to obtain decoded side information.

3. The method of claim 1, wherein the determining the one or more significant bits further comprises:
    measuring the prediction of the signal using a linear operator to obtain linear measurements;
    dithering the linear measurements to obtain dithered linear measurements;
    quantizing the dithered linear measurements to obtain the quantized dithered linear measurements; and
    extracting the missing one or more significant bits of each quantized linear measurement as the missing one or more significant bits.

4. The method of claim 1, wherein the prediction of the signal is obtained from the side information using linear prediction.

5. The method of claim 1 further comprising:
    correcting the missing one or more significant bits using the side information.

6. The method of claim 1, further comprising:
    updating the prediction of the signal and the side information using the reconstructed signal; and repeating the determining, the combining, and the reconstructing steps using the updated prediction and side information.

7. The method of claim 1, wherein the side information includes a signal similar to the encoded signal.

8. The method of claim 1, wherein the side information includes statistical similarity measures of the encoded signal with a signal similar to the encoded signal.

9. The method of claim 8, wherein the statistical similarity measures includes a mean, a covariance, and a correlation of the signal.

10. The method of claim 1, wherein the side information includes corrections to errors produced by determining the one or more missing significant bits.

11. The method of claim 10, wherein the corrections are determined at an encoder.

12. The method of claim 1, wherein the side information includes quantized measurements of the signal.

13. The method of claim 1, wherein the signal is encoded in an encoder, and further comprising:
    obtaining universal linear measurements of the signal;
    adding dither to the universal linear measurement to produce dithered linear measurements; and
    applying non-monotonic quantization to the universal linear measurements to produce the encoded signal.

14. The method of claim 13, wherein the non-monotonic quantization further comprises:
    quantizing the dither linear measurements using a monotonic quantizer; and
    discarding the one or more significant bits of each measurement.

15. The method of claim 1 wherein the reconstructing solves an optimization problem.

16. The method of claim 15, wherein the optimization enforces a sparsity model.

17. The method of claim 15, wherein the optimization enforces low signal total variation.

18. The method of claim 15, wherein the optimization uses weights derived from the side information.

19. The method of claim 15 wherein the optimization uses weights derived from the signal prediction.

20. The method of claim 15, wherein the optimization is performed using a greedy algorithm.

21. The method of claim 15, wherein the optimization is performed using a convex relaxation.

22. The method of claim 15, wherein the optimization is using a dictionary.

23. The method of claim 22, wherein the dictionary is learned from the prediction.

24. The method of claim 22, wherein the dictionary is learned from the reconstructed signal.

25. The method of claim 1, wherein the signal is a multispectral image.

26. The method of claim 1, wherein the signal is acquired by a radar system.

27. The method of claim 26, wherein the radar system is a synthetic aperture radar (SAR).

* * * * *